Nov. 3, 1953

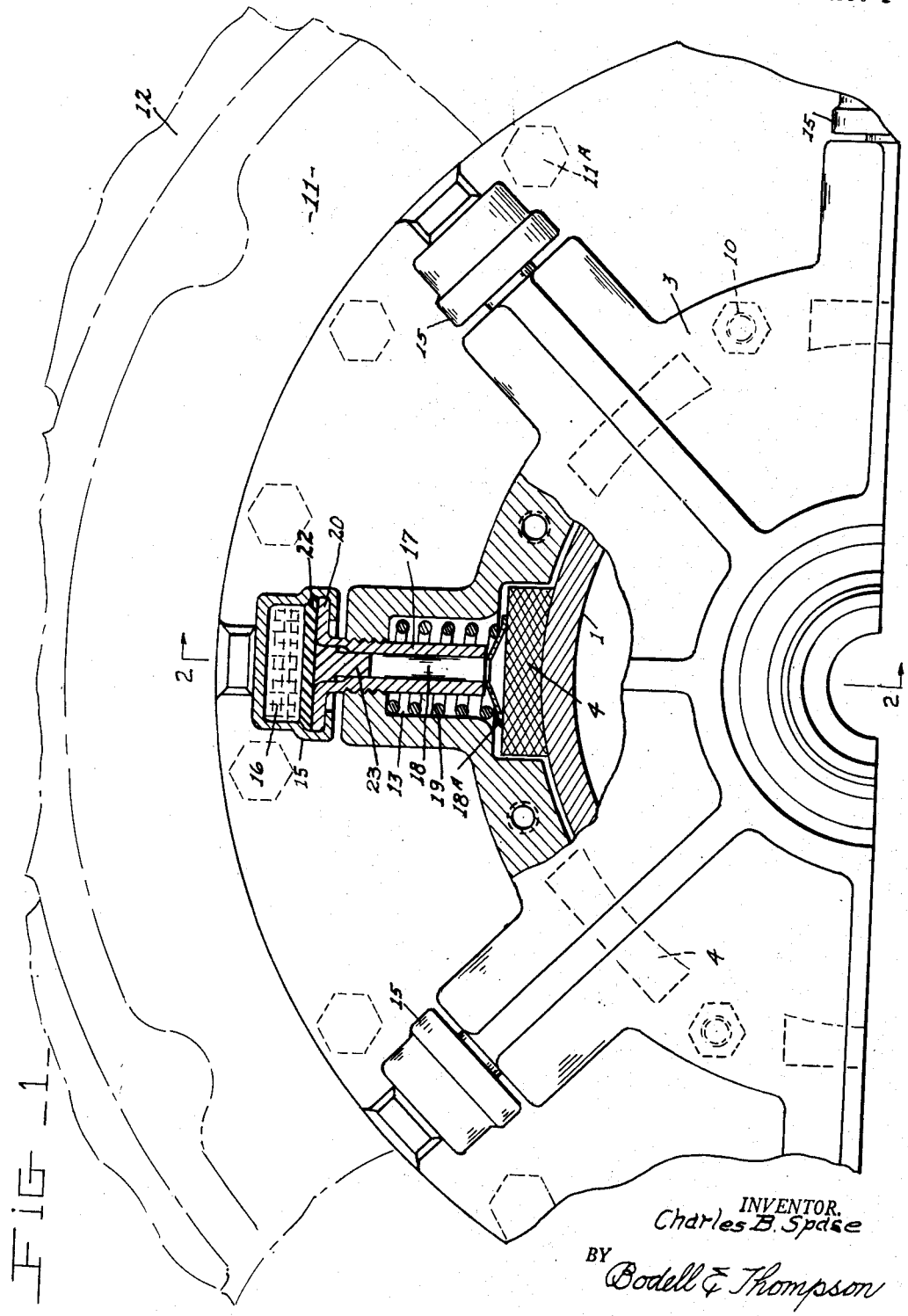

C. B. SPASE 2,657,852

COOLING FAN CONTROL FOR AIR-COOLED ENGINES

Filed April 14, 1951

INVENTOR.
Charles B. Spase
BY
Bodell & Thompson
ATTORNEYS

Patented Nov. 3, 1953

2,657,852

UNITED STATES PATENT OFFICE 2,657,852

COOLING FAN CONTROL FOR AIR-COOLED ENGINES

Charles B. Spase, Nedrow, N. Y., assignor to Lipe-Rollway Corporation, Syracuse, N. Y., a corporation of New York Application April 14, 1951, Serial No. 221,019

5 Claims. (Cl. 230—271)

This invention relates to fans for drawing, by suction, air over internal combustion engines to cool the engine, and has for its object a fan including a driving hub mountable on an engine actuated shaft and provided with an annular friction face, a casing rotatably mounted on the hub and enclosing the hub, a clutch shoe carried by the casing in position to coact with the friction face, and unitary thermostatic means carried by the casing sensitive to the temperature of the air drawn by the fan to press the clutch shoes against the clutch face with increasing force as the temperature of the air drawn over the engine by the fan increases.

The feature of the invention is primarily a thermostatically operated clutch which initially engages with little but some pressure when the engine starts so that the torque on the fan shaft is low at the start to prevent twisting or breaking of the fan shaft due to sudden starting and so that the clutching effect increases as the temperature of the air drawn by the fan over the heating engine increases.

Another feature is the mechanical arrangement of the driving hub, driven casing and the clutch and clutch operating means between the casing and the hub.

The invention consists in the novel features and in the combinations and constructions hereinafter set forth and claimed.

In describing this invention, reference is had to the accompanying drawings in which like characters designate corresponding parts in all the views.

Figure 1 is a fragmentary elevation, partly in section, of this fan structure.

Figures 2, 3:
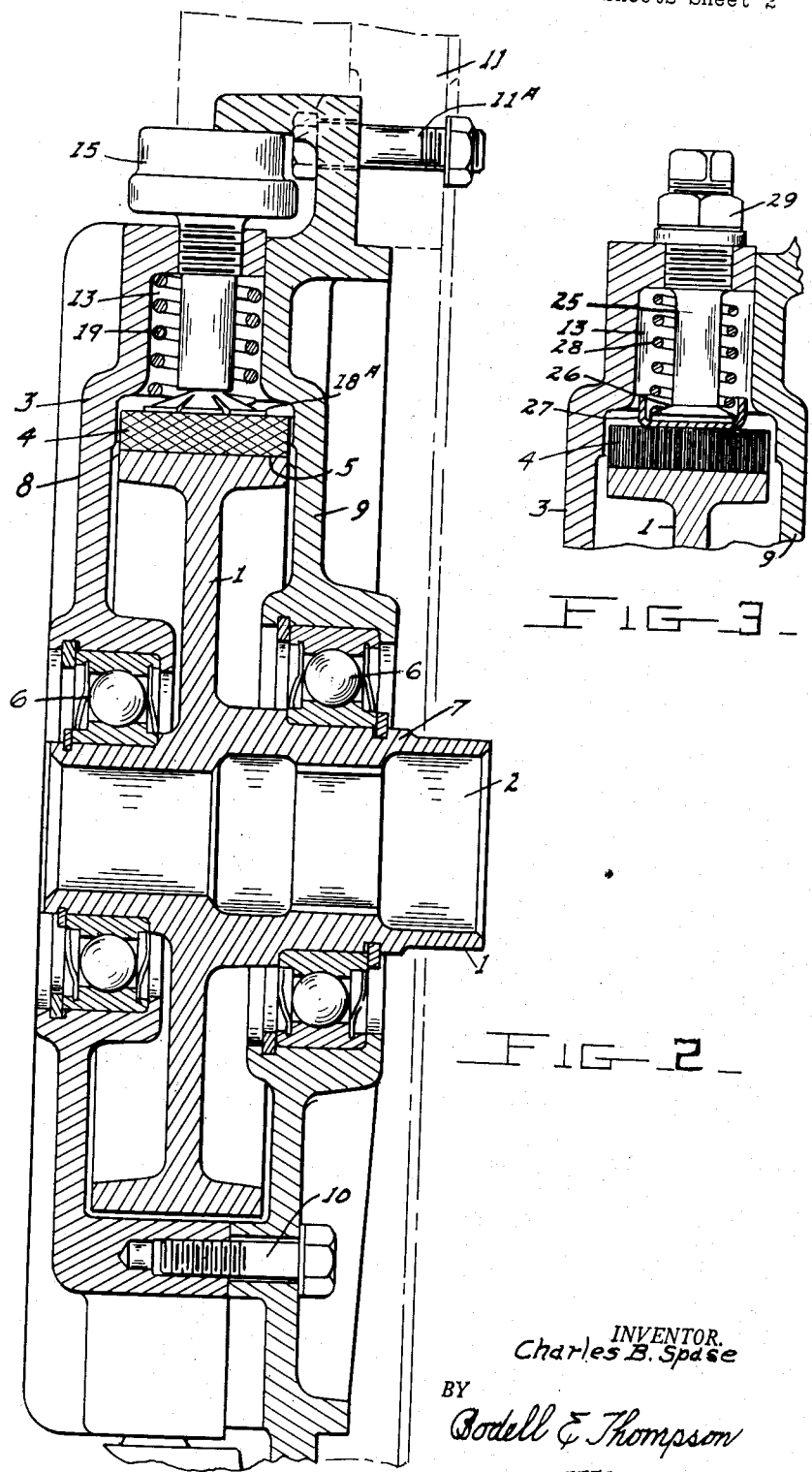
Figure 2 is a sectional view taken on the plane of line 2—2, Figure 1.
Figure 3 is a fragmentary sectional view through the casing showing a modified form of the clutch means between the hub and the casing.

This fan comprises generally a hub 1 having an axial bore 2 which is mountable upon a shaft actuated by or from the crank shaft of the engine, a casing 3 mounted to rotate relative to the hub. Clutch shoes as 4 are positioned on an annular portion of the hub and which forms a peripheral clutch face 5. The casing 3 is here shown as mounted by bearings 6 on axial sleeve portions 7 of the hub 1, which sleeve portions enclose the bore 2. The casing is formed of front and rear plates 8, 9, secured together, as by screws 10, and the rear plate 9 comprises an annulus 11 from which the fan blades 12 extend. The annulus is secured to the rear plate by screws 11A. The casing entirely encloses the hub 1 and is formed with recesses 13 which extend radially at intervals around the casing, in the inner ends of which recesses 13 are located the friction shoes 4. There is also mounted in the recess means for applying pressure to the friction shoes 4. The casing plates 8, 9, are preferably of a high heat conducting metal, as aluminum alloy.

The pressure applying means preferably embodies thermostatic elements for automatically applying the pressure to the shoes 4 as the temperature of the air drawn by the fan over the engine increases, this pressure applying means being arranged at the start when the engine is cool to apply sufficient pressure only to cause the rotation of the hub to be transferred to the friction shoes with slippage to avoid straining of the fan shaft when the engine starts.

The thermostatic means is a unitary structure and as here shown comprises a head 15 enclosing a container in which is located a thermostatic element 16, or a body of thermostatic metal, the container having a tubular stem 17 which threads into the outer end wall of the recess 13 and extends towards the clutch shoe 4 located in the inner end of the recess, and means for transferring the expansion of the thermostatic element 16 to the shoe 4 including a plunger 18 slidable in the stem 17 and a yielding washer 18A overlying the shoe 4 and against which the plunger 18 thrusts. A compression spring 19 is also located in the recess 13 and thrusts against the washer 18A independently of the plunger 18.

The stem 17 has an annular flange 20 at its outer end overlying the bottom of the receptacle in the head 15. The thrust of the thermostatic element 16 is transferred to the plunger 18 through a bed 22 of somewhat resilient material as neoprene, and a rod 23.

As the temperature of the air increases the thermostatic element 16 expands and through the plunger 18 first compresses the washer 18A so that it eventually acts as a solid washer and applies the full pressure of the thermostatic element 16 to the shoe 4. Hence, the casing 3 eventually rotates as a unit with the hub 1. The spring 19 is loaded sufficiently to insure that the fan will rotate at the start with slippage before the thermostatic element expands and the washer 18A is not initially loaded sufficiently to cause the shoe 4 to take hold of the friction face 5.

In Figure 3 is shown a view in which the pressure, on the shoe 4, is applied through a stem 25 threading into the outer end of the recess 13 and bottoming on a flexible washer 26 located in a shallow cup-shaped receptacle 27 interposed between the washer and the shoe 4, this washer being acted upon by a compression spring 28 in the recess 13. The stem 25 is held in its axially adjusted position by a lock nut 29 threading on the outer end of the stem outside of the recess 13. In the form shown in Figure 3, the fan operates the same as in the forms shown in Figures 1 and 2, except that there is no thermostatic element. In Figure 3, for atmospheric temperatures lower than 90° F., the lock nut 29 is loosened and the screw or stem 25 turned until the screw 25 and the washer 26 bottoms solidly. The screw is then backed off a half turn and the lock nut again tightened. This moves the inner end of the screw 25 away from the spring washer 26 whereby the pressure applied on the shoe 4 is through the spring 28. For atmospheric temperatures higher than 90° F., the nut 29 is backed off and the screw 25 threaded outwardly one and one-half turns. This structural arrangement in Figure 3 is employed where the vehicle is used continuously in a cold climate, or a hot climate. When the vehicle is operated continuously in a hot climate, it is necessary that the maximum torque be transmitted to the cooling fan, in which event the screw 25 is screwed inwardly against the spring washer 26 to create sufficient pressure of the shoe 4 on the annular surface of the hub member. When the vehicle is operated continuously in a cold climate, the screw 25 is backed out and the pressure on the shoes 4 is obtained from the springs 28. However, in the form shown in Figures 1 and 2, it is not necessary to adjust the thermostatic device for different atmospheric temperatures. It is only necessary that the plunger of the thermostatic device press initially on the washer 19A sufficiently to hold the shoe 4 in light frictional contact with the clutch face 5 as the temperature increases the thermostatic element 16 expands and its pressure on the plunger 18 correspondingly increases.

What I claim is:

1. A fan for air cooled engines comprising a hub mountable on an engine actuated shaft, the hub having an annular friction face, a casing enclosing the hub to rotate relatively thereto, an annulus carried by the casing and having outwardly extending fan blades, a friction shoe carried by the casing and opposed to the friction face of the hub, a unitary device carried by the casing and rigid therewith and comprising a thermostatic element and means including a plunger located intermediate said element and said shoe to transfer the expansion of the thermostatic element to the friction shoe as the thermostatic element is heated by the heated air drawn by the fan.

2. A fan for air cooled engines comprising a hub mountable on an engine actuated shaft, the hub having an annular friction face, a casing enclosing the hub to rotate relatively thereto, an annulus carried by the casing and having outwardly extending fan blades, the casing being formed with a radially extending recess, a friction shoe located in the inner end of the recess and opposed to the friction face of the hub, a unitary device carried by the casing and extending into the recess and comprising a thermostatic element, and means to transmit the expansion of said element to the shoe including a plunger extending into the recess, and spring means also located in the recess and thrusting against the friction shoe independently of the means which includes the plunger.

3. A fan for air cooled engines comprising a hub mountable on an engine actuated shaft, the hub having an annular friction face, a casing enclosing the hub to rotate relatively thereto, an annulus carried by the casing and having outwardly extending fan blades, the casing being formed with a radially extending recess, a friction shoe located in the inner end of the recess and opposed to the friction face of the hub, a unitary device carried by the casing and extending into the recess and comprising a thermostatic element, and means to transmit the expansion of said element to the shoe including a plunger extending into the recess, and a yielding washer between the plunger and the friction shoe against which the plunger thrusts.

4. A fan for air cooled engines comprising a hub mountable on an engine actuated shaft, the hub having an annular friction face, a casing enclosing the hub to rotate relatively thereto, an annulus carried by the casing and having outwardly extending fan blades, the casing being formed with a radially extending recess, a friction shoe located in the inner end of the recess and opposed to the friction face of the hub, a unitary device carried by the casing and extending into the recess and comprising a thermostatic element, and means to transmit the expansion of said element to the shoe including a plunger extending into the recess, and a yielding washer between the plunger and the friction shoe against which the plunger thrusts, and spring means thrusting against the yielding washer independently of the plunger.

5. A fan for air cooled engines comprising a hub mountable on an engine actuated shaft, the hub having an annular friction face, a casing enclosing the hub and mounted to rotate relatively thereto, an annulus carried by the casing and having outwardly extending blades, the casing having a radial recess, a friction shoe carried by the casing in the recess and opposed to the friction face of the hub, a unitary device carried by the casing and located in the recess to press the friction shoe toward the friction face of the hub, said device comprising a stem threading into the hub, a yielding washer between the end of the stem and the friction shoe, and compression spring means in the recess around the stem and thrusting against the washer, the stem being adjustable axially in the recess.

CHARLES B. SPASE.

References Cited in the file of this patent

UNITED STATES PATENTS

| Number | Name | Date |
|---|---|---|
| 2,351,225 | Patrick | June 13, 1944 |
| 2,381,567 | Bonham | Aug. 7, 1945 |
| 2,503,262 | Hall | Apr. 11, 1950 |